(12) United States Patent
Khan

(10) Patent No.: US 6,956,721 B1
(45) Date of Patent: Oct. 18, 2005

(54) SUSPENSION HAVING SPRING WITH PREFERENTIAL BENDING IN WELDMENT-FREE ZONE

(75) Inventor: Amanullah Khan, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 107 days.

(21) Appl. No.: 10/195,777

(22) Filed: Jul. 15, 2002

Related U.S. Application Data

(60) Provisional application No. 60/391,823, filed on Jun. 26, 2002.

(51) Int. Cl.[7] ............................ G11B 5/48; G11B 21/16
(52) U.S. Cl. ................................................. 360/244.8
(58) Field of Search .......................... 360/244.8, 244.2, 360/244, 240

(56) References Cited

U.S. PATENT DOCUMENTS

| | | | | |
|---|---|---|---|---|
| 5,408,372 | A | * 4/1995 | Karam, II | 360/244.2 |
| 5,455,727 | A | * 10/1995 | Baral et al. | 360/244.8 |
| 5,914,835 | A | * 6/1999 | Girard et al. | 360/244.8 |
| 6,147,839 | A | * 11/2000 | Girard | 360/244.8 |
| 6,532,135 | B1 | * 3/2003 | Chen et al. | 360/244.8 |
| 6,687,091 | B1 | * 2/2004 | Chen et al. | 360/244.8 |

FOREIGN PATENT DOCUMENTS

| | | | | |
|---|---|---|---|---|
| JP | 10055634 A | * 2/1998 | | G11B 21/02 |
| WO | WO 9424664 A1 | * 10/1994 | | G11B 5/596 |
| WO | WO 9809275 A1 | * 3/1998 | | G11B 5/48 |

OTHER PUBLICATIONS

"Slits in Snare Tube to Reduce Stiffness of Head Suspension," Nov. 1, 1989, IBM TDB, vol. No. 32, Iss. No. 6A, p. 175.*
"Suspension Assembly with Torsion-Proof Stiffeners," Apr. 1, 1993, IBM TDB, vol. No. 36, Iss. No. 4, pp. 71-72.*

* cited by examiner

*Primary Examiner*—William J Klimowicz
(74) *Attorney, Agent, or Firm*—Louis J. Bachand

(57) ABSTRACT

A disk drive suspension has a load beam with a base portion, a spring portion and a rigid portion to carry a flexure and slider in operative association with a disk. The spring portion is normally bendable between the base portion and the rigid portion. Welding of the spring portion to the base portion and the rigid portion tends to raise the temperature of the adjacent parts of the spring portion to temperatures above their annealed temperature and there is a loss of temper and thus spring properties in these adjacent parts. The invention limits the bending of the spring portion to a region between the base and rigid portion adjacent parts by stiffening the spring portion locally in these parts as with an edge rail. The non-railed region of the spring portion remains bendable and is far enough away from welding heat that it retains its temper and spring properties.

29 Claims, 1 Drawing Sheet

SUSPENSION HAVING SPRING WITH PREFERENTIAL BENDING IN WELDMENT-FREE ZONE

REFERENCE TO RELATED APPLICATIONS

This application claims the benefit of U.S. Provisional Application Ser. No. 60/391,823 filed Jun. 26, 2002.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and, more particularly, to disk drive multipiece suspensions having a spring portion that is weld-attached to the suspension base and rigid portions. The invention suspensions have the spring portion bend preferentially in a zone removed from the weldment areas to be free of influences of weld-heating.

2. Description of the Related Art

Multipiece suspensions use a separate metal member as the spring portion. This spring portion is welded to the proximate or base portion of the suspension and to the distal or rigid portion of the suspension. The welding operation may adversely affect the spring properties of the spring portion, particularly since the spring portion has only a small axial extent as suspensions become smaller and smaller.

BRIEF SUMMARY OF THE INVENTION

It is an object, therefore, of the present invention to provide an improved disk drive suspension. It is a further object to provide a suspension in which the spring portion flexing or bending is limited to a relatively small region that is substantially centered and equidistantly spaced from the proximate and distal sections of the spring portion that are secured by welding to adjacent base and rigid portions of the suspension. It is another object to provide a suspension spring portion that is locally stiffened to have limited bending ability except beyond the locally stiffened zones. It is a further object to provide a disk drive suspension in which the loss of temper in the spring portion sometimes associated with welding the spring portion to adjacent base and rigid portions is avoided in the center of the spring portion, and in which the spring region is substantially restricted to the center of the spring portion. It is a still further object to provide a disk drive suspension spring portion that bends in a limited region well spaced from any areas of the spring portion that may be subjected to weld-heating, the limited region being defined by opposed pairs of rails that are interrupted intermediate their ends at the locus of intended bending.

These and other objects of the invention to become apparent hereinafter are realized in a disk drive suspension having along a longitudinal axis a base portion, a rigid portion and a bendable spring portion, the spring portion being extended along the longitudinal axis a given extent and having edge rails that are interrupted at a locus, bending of the spring portion being limited by the edge rails except at their interruption, whereby the locus of the spring portion bending extends longitudinally less than the given extent and is defined by the locus of interruption.

In this and like embodiments, typically, the base portion and the spring portion are separately formed and joined together solely by welding, the spring portion edge rails having distal and proximate extents on opposite sides of the locus of interruption, the distal and proximate extents being distal of the welding, the base portion has a distal edge margin, and the spring portion has a proximate edge margin, the distal and proximate edge margins being joined solely by welding, the edge rail extents include a pair of left and right hand proximate edge rail extents and a pair of left and right hand distal edge rail extents, the pairs being laterally opposed, the distal and proximate edge rail extents being longitudinally spaced across the locus of interruption, the spring portion has a proximate section adjacent the proximate edge margin that is free of welding, the proximate edge rail extents extending vertically from the proximate section in proximate section stiffening relation, and the spring portion has a center section distal of and contiguous with the proximate section, the longitudinal extent of the proximate section being such that the heat of welding the spring portion proximate edge margin to the base portion distal edge margin does not substantially reduce the temper hardness of the center section.

Additionally, or separately, in this and like embodiments, typically, the rigid portion and the spring portion are separately formed and joined together solely by welding, the spring portion edge rails having distal and proximate extents on opposite sides of the locus of interruption, the distal and proximate extents being distal of the welding, the rigid portion has a proximate edge margin, and the spring portion has a distal edge margin, the proximate and distal edge margins being joined solely by welding, the edge rail extents include a pair of left and right hand proximate edge rail extents and a pair of left and right hand distal edge rail extents, the pairs being laterally opposed, the distal and proximate edge rail extents being longitudinally spaced across the locus of interruption, the spring portion has a distal section adjacent the proximate edge margin that is free of welding, the distal edge rail extents extending vertically from the distal section in distal section stiffening relation, and the spring portion has a center section proximate of and contiguous with the distal section, the longitudinal extent of the distal section being such that the heat of welding the spring portion distal edge margin to the rigid portion distal edge margin does not substantially reduce the temper hardness of the center section.

In this and like embodiments, the left and right laterally opposed pairs of rail extents are substantially parallel, the base portion and the spring portion are separately formed and joined together solely by welding, the spring portion edge rails having distal and proximate extents on opposite sides of the locus of interruption, the distal and proximate extents being distal of the welding, the base portion has a distal edge margin, and the spring portion has a proximate edge margin, the distal and proximate edge margins being joined solely by welding, the edge rail extents include a pair of left and right hand proximate edge rail extents and a pair of left and right hand distal edge rail extents, the pairs being laterally opposed, the distal and proximate edge rail extents being longitudinally spaced across the locus of interruption, the spring portion has a proximate section adjacent the proximate edge margin that is free of welding, the proximate edge rail extents extending vertically from the proximate section in proximate section stiffening relation, and the spring portion has a center section distal of and contiguous with the proximate section, the longitudinal extent of the proximate section being such that the heat of welding the spring portion proximate edge margin to the base portion distal edge margin does not substantially reduce the temper hardness of the center section.

In a further embodiment, the invention provides a disk drive suspension comprising a load beam having a base portion, a spring portion and a beam portion, the spring portion being normally bendable over a given axial extent between proximate and distal edge margins, the spring portion being locally stiffened between the edge margins to be bendable only over a part of the spring portion axial extent.

In this and like embodiments, typically, the spring portion part is intermediate the spring portion distal and proximate edge margins, the spring portion has interrupted right and left hand rails providing the local stiffening.

In a further embodiment, the invention provides a disk drive suspension comprising a base portion, a beam portion and a spring portion therebetween, the spring portion having a proximate edge margin welded to the base portion, and a distal edge margin welded to the rigid portion, and a center region between the proximate and distal edge margins, the center region having a proximate section contiguous with the proximate edge margin and subject to loss of temper hardness during welding of the proximate edge margin to the base portion, a distal section contiguous with the distal edge margin and subject to loss of temper hardness during welding of the distal edge margin to the rigid portion, and a center section between the proximate and distal sections that is sufficiently distant from the proximate and distal edge margins to not be subject to loss of temper hardness from welding at the edge margins, the spring portion normally being bendable throughout its center region, the spring portion center region being locally stiffened in its proximate and distal sections to limit spring portion bending to the center section whereby the spring portion bending is localized in the center section and unaffected by edge margin welding.

In its method aspects, the invention provides a method of limiting the bendable region of a disk drive suspension spring portion, including supporting the spring portion between a suspension base portion and a suspension rigid portion, and stiffening the spring portion locally to limit the bendable region of the spring portion to the part of the spring portion free of local stiffening.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
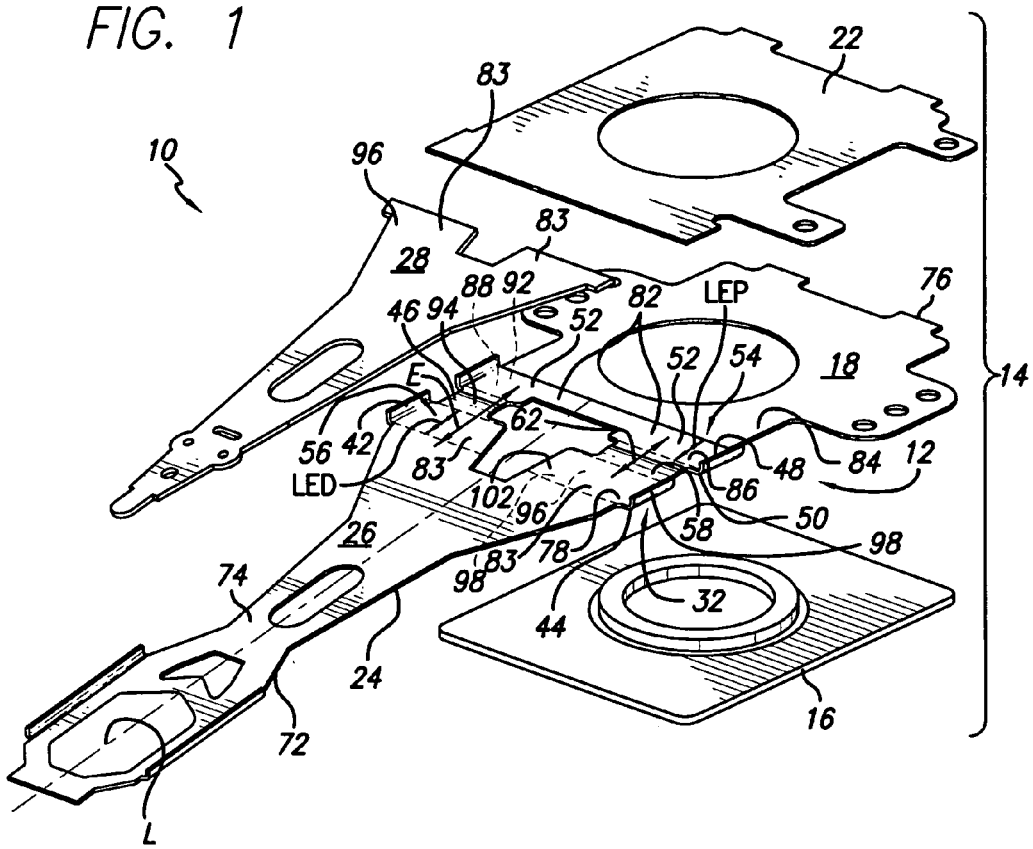
FIG. 1 is an exploded, oblique view of the invention suspension.

The load beam of a disk drive suspension comprises a base portion, a spring portion and a rigid portion arranged to apply a vertical force on the slider as it flies over the disk. The amount of vertical force depends on the vertical stiffness (spring rates) of the load beam and the free state angle as determined by the bend of the load beam. The vertical stiffness also depends on the length of the spring portion of the load beam, the spring portion here being the weaker part of the load beam. Typically, at both ends of spring portion length, the sections adjacent the rigid or base portions are made more rigid than the balance of the spring per se by welding on a mount plate, by forming rails, or by welding a thicker material to it.

In general, in a magnetic drive suspension comprising a mount plate, load beam and a flexure, the load beam is welded to the mount plate and the rigid part of the load beam is made by bending the load beam at an angle and/or welding a plate as a stiffener or support plate to it. The rigid portion of the load beam is designed with a view toward having a controlled stiffness, shape and other mechanical parameters to achieve optimum parameters of the suspension.

One of the problems with presently available suspensions is a variation in their vertical stiffness property. This property, which is largely governed by the spring portion length (its axial extent parallel with the suspension longitudinal axis), is subject to change as the spring portion is weld-attached to the base portion (which term herein includes the mount plate and other structures at the proximate end of the suspension as well as the base portion per se) and to the rigid portion (which term herein includes the rigid portion per se and any stiffener and support plates that may be added).

Vertical stiffness in this respect can vary unpredictably as the weldment diameters and locations vary due to manufacturing tolerances. Further, the suspension resonance frequencies and gains are also varied since they are functions of stiffness as well as of the suspension inertial properties.

Spring portion length is generally becoming shorter, particularly with newer, multi-piece designs having a welded support plate piece. It is a serious manufacturing challenge to form the spring in the available short area, but, making the spring length a bit more extended, decreases the resonance frequencies, and weakens the spring portion mechanical properties.

The present invention employs short fold up rails to make the spring portion less sensitive to the adjacent welds. A rail on the spring portion that is adjacent or next to the base portion mount plate will minimize the weld diameter effect on the spring portion proximate zone, and a rail on the spring portion that is adjacent or next to the rigid portion support plate will minimize the weld diameter effect on the spring portion distal zone for an improved suspension having improved spring portion properties.

In general, the invention strategically placed short rail pairs will provide most of the rigidity near the mount plate, and will define the commencement of the rigid zone very accurately through the possible very tight etching tolerances compared to welding tolerances. Support plate adjacent rails will provide the same benefits at the distal zone of the spring portion, and additionally provide more room for gram forming operations. Further, the presence of the rails at both proximate and distal zones of the spring portion will reduce the effects of the welds, and thus give tighter control of resonance frequencies and gains. This result in turn improves manufacturing yields, as tighter control of resonance is one a key performance parameters.

Figure 2:
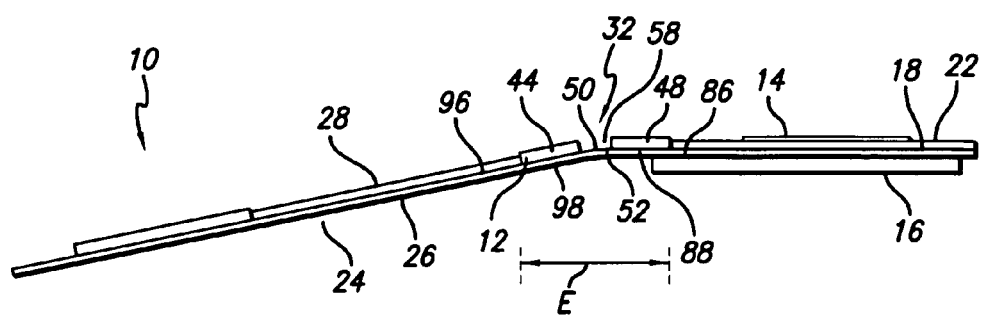
FIG. 2 is a side elevation view thereof.

With reference now to FIGS. 1 and 2 of the drawings in detail, disk drive suspension 10 has a longitudinal axis L, and comprises a load beam 12 having a base portion 14 including a mount plate 16, a base per se 18 and a base plate 22. Suspension 10 further comprises a rigid portion 24 including a beam 26 and a support plate 28. Suspension 10 further includes a bendable spring portion 32. Spring portion 32 is extended along the longitudinal axis L a given extent E and has local stiffening through thickening, folding or otherwise increasing the amount or nature of the material in the area of local stiffening, and preferably, as shown, by providing edge rails 42, 44, 46, 48 arranged by virtue of interruption 50 at locus 52 into a proximate pair 54, and a distal pair 56. In accordance with the invention the edge rails 42–48 locally stiffen the spring portion 32 on either side of locus 52 to allow bending of the spring portion substantially solely at the locus where the spring portion is free of stiffening. Thus, bending of the spring portion 32 is limited by the edge rails 42–48 except at their interruption 50. Since the spring portion 32 length, extent E, is not changed, just the bendable region 58 of the spring portion, it will be noted that the locus 62 of spring portion bending extends longitudinally less than the given extent E and is defined by the locus 52 of interruption 50.

In the preferred embodiment shown, the suspension 10 includes a unitary elongated member 72 shaped distally into a forward segment 74 that forms the beam 26, a proximate segment 76 that forms the base 18 and a spring segment 78 that is the spring portion 32. Base portion mounting plate 16 and base plate 22 are separately formed from the spring segment/spring portion 78/32 and are joined together preferably solely by welding at sites 82.

The spring portion 32 edge rails 42–48 include the pair 56 of distal extents 42, 44 and the pair 54 of proximate extents 46, 48, the pairs being located to be laterally opposed between pair members and longitudinally opposed across, or on opposite sides of, the interruption locus 52. Distal and proximate edge pairs 56, 54 are located distal of the welding sites 82.

The base portion 14 has a distal edge margin 84, and the spring portion 32 has a proximate edge margin 86. These distal and proximate edge margins 84, 86 are preferably joined solely by welding, as at sites 82. The edge rail extents 42–48 include the pair 54 of left and right hand proximate edge rail extents 46, 48 and the pair 56 of left and right hand distal edge rail extents 42, 44.

Spring portion 32 has a proximate section 88 adjacent the proximate edge margin 86 and that is free of welding. The proximate edge rail extents 46, 48 extend vertically, e.g. at 30 to 90 degrees from the planar surface 92 of proximate section 88 in proximate section stiffening relation.

The spring portion 32 further has a center section 94 distal of and contiguous with the proximate section 88. The longitudinal extent LEP of the proximate section 88 is such that the heat of welding the spring portion proximate edge margin 86 to the base portion distal edge margin 84, e.g. at sites 82, does not substantially reduce the temper hardness of the center section 94.

The spring portion 32 further is weld-attached to the rigid portion support plate 28 where the support plate is separately formed from the spring portion, and typically joined solely by welding. The rigid portion support plate 28 has a proximate edge margin 96; spring portion having a distal edge margin 98. The plate 28 proximate edge margin 96 and the spring portion edge margin 98 are typically joined solely by welding e.g. at sites 83. The edge rail extents 42–48 are as just described and extend in the spring portion distal section 102 that is adjacent and inward of the spring portion distal edge margin 98 and typically free of welding. The distal edge rail extents 42, 44 extend vertically, e.g. at 30 to 90 degrees from the planar surface 95 of distal section 102 in distal section stiffening relation. Spring portion center section 94 is proximate of and contiguous with the distal section 102. The longitudinal extent LED of the distal section 102 is such that the heat of welding the spring portion distal edge margin 98 to the rigid portion proximate edge margin 96 does not substantially reduce the temper hardness of the center section 94.

The left and right rail extents 42, 46 and 44, 48 that are laterally opposed are preferably substantially parallel, that is within 30 degrees of parallel.

In summary, the invention apparatus comprises disk drive suspension 10 with a load beam 12 having a base portion 14, a spring portion 32 and a rigid or beam portion 24. Spring portion 32 is normally bendable over a given axial extent E between spring portion proximate and base portion distal edge margins 86, 84, but the spring portion is locally stiffened between its proximate and distal edge margins 86, 88 to be bendable only over a part of the spring portion axial extent E defined by bendable region 58. The spring portion axial extent E is intermediate the spring portion distal and proximate edge margins 98, 86 and the spring portion has interrupted right and left hand rails 42–48 providing the local stiffening.

In further detail, the invention disk drive suspension 10 comprising the base portion 14, a rigid or beam portion 24 and a spring portion 32 therebetween. The spring portion 32 has a proximate edge margin 86 welded to the base portion 14, a distal edge margin 98 welded to the rigid portion 24, and a center region or section 94 between the proximate and distal edge margins. The center region 94 has a proximate section 88 contiguous with the base portion distal proximate edge margin 84 and subject to loss of temper hardness during welding of the spring portion proximate edge margin 86 to the base portion distal edge margin. Center region 94 further has a distal section 102 contiguous with the spring portion distal edge margin 98 and subject to loss of temper hardness during welding of the distal edge margin to the rigid portion 24, and a center section 94 between the proximate and distal sections that is sufficiently distant from the spring portion proximate and distal edge margins to not be subject to loss of temper hardness from welding at the edge margins. The spring portion 32 is normally bendable throughout its center region 94, but the spring portion center region is locally stiffened in its proximate and distal sections 88, 102 to limit spring portion bending to the center section, whereby the spring portion bending is localized in the center section and unaffected by edge margin welding.

The invention method for limiting the bendable region of a disk drive suspension spring portion 32 includes supporting the spring portion between a suspension base portion 14 and a suspension rigid portion 24, and stiffening the spring portion locally to limit the bendable region of the spring portion to the part 58 of the spring portion free of local stiffening.

The invention thus provides an improved disk drive suspension in which the spring portion flexing or bending is limited to a relatively small region that is substantially centered and equidistantly spaced from the proximate and distal sections of the spring portion that are secured by welding to adjacent base and rigid portions of the suspension by having the spring portion locally stiffened to have limited bending ability except beyond the locally stiffened zones. In the improved disk drive suspension the loss of temper in the spring portion sometimes associated with welding the spring portion to adjacent base and rigid portions is avoided in the center of the spring portion, as the spring region is substantially restricted to the center of the spring portion, and the spring portion bends in a limited region well spaced from any areas of the spring portion that may be subjected to weld-heating, the limited region being defined by opposed pairs of rails that are interrupted intermediate their ends at the locus of intended bending.

The foregoing objects are thus met.

I claim:

1. A disk drive suspension having along a longitudinal axis a base portion, a rigid portion and a bendable spring portion having left and right edges, said spring portion being extended along said longitudinal axis a given extent, said spring portion left and right edges having separate local stiffening structures interrupted at a locus intermediate said spring portion length, whereby the locus of said spring portion bending extends longitudinally less than said given extent and is defined by said locus of interruption.

2. The disk drive suspension according to claim 1, in which said base portion and said spring portion are separately formed and joined together solely by welding, said spring portion separate local stiffening structures having distal and proximate extents on opposite sides of said locus of interruption, said distal and proximate extents being distal of said welding.

3. The disk drive suspension according to claim 2, in which said base portion has a distal edge margin, and said spring portion has a proximate edge margin, said distal and proximate edge margins being joined solely by welding.

4. The disk drive suspension according to claim 3, in which said separate local stiffening structures include a pair of left and right hand proximate stiffening structure extents and a pair of left and right hand distal stiffening structure extents, said pairs being laterally opposed, the distal and proximate stiffening structure extents being longitudinally spaced across said locus of interruption.

5. The disk drive suspension according to claim 4, in which said spring portion has a proximate section adjacent said proximate edge margin that is free of welding, said proximate local stiffening structures extending vertically from said proximate section in proximate section stiffening relation.

6. The disk drive suspension according to claim 5, in which said spring portion has a center section distal of and contiguous with said proximate section, the longitudinal extent of said proximate section being such that the heat of welding said spring portion proximate edge margin to said base portion distal edge margin does not substantially reduce the temper hardness of said center section.

7. A disk drive suspension having along a longitudinal axis a base portion, a rigid portion and a bendable spring portion, said spring portion being extended along said longitudinal axis a given extent and having edge rails that are interrupted at a locus, bending of said spring portion being limited by said edge rails except at their interruption, whereby the locus of said spring portion bending extends longitudinally less than said given extent and is defined by said locus of interruption, said base portion and said spring portion being separately formed and joined together solely by welding, said spring portion edge rails having distal and proximate extents on opposite sides of said locus of interruption, said distal and proximate extents being distal of said welding.

8. The disk drive suspension according to claim 7, in which said base portion has a distal edge margin, and said spring portion has a proximate edge margin, said distal and proximate edge margins being joined solely by welding.

9. The disk drive suspension according to claim 8, in which said edge rail extents include a pair of left and right hand proximate edge rail extents and a pair of left and right hand distal edge rail extents, said pairs being laterally opposed, the distal and proximate edge rail extents being longitudinally spaced across said locus of interruption.

10. The disk drive suspension according to claim 9, in which said spring portion has a proximate section adjacent said proximate edge margin that is free of welding, said proximate edge rail extents extending vertically from said proximate section in proximate section stiffening relation.

11. The disk drive suspension according to claim 10, in which said spring portion has a center section distal of and contiguous with said proximate section, the longitudinal extent of said proximate section being such that the heat of welding said spring portion proximate edge margin to said base portion distal edge margin does not substantially reduce the temper hardness of said center section.

12. The disk drive suspension according to claim 11, in which laterally opposed pairs of said left and right rail extents are substantially parallel.

13. A disk drive suspension having along a longitudinal axis a base portion, a rigid portion and a bendable spring portion, said spring portion being extended along said longitudinal axis a given extent and having edge rails that are interrupted at a locus, bending of said spring portion being limited by said edge rails except at their interruption, whereby the locus of said spring portion bending extends longitudinally less than said given extent and is defined by said locus of interruption said rigid portion and said spring portion being separately formed and joined together solely by welding, said spring portion edge rails having distal and proximate extents on opposite sides of said locus of interruption, said distal and proximate extents being proximate of said welding.

14. The disk drive suspension according to claim 13, in which said rigid portion has a proximate edge margin, and said spring portion has a distal edge margin, said proximate and distal edge margins being joined solely by welding.

15. The disk drive suspension according to claim 14, in which said edge rail extents include a pair of left and right hand proximate edge rail extents and a pair of left and right hand distal edge rail extents, said pairs being laterally opposed, the distal and proximate edge rail extents being longitudinally spaced across said locus of interruption.

16. The disk drive suspension according to claim 15, in which said spring portion has a distal section adjacent said spring distal edge margin that is free of welding, said distal edge rail extents extending vertically from said distal section in distal section stiffening relation.

17. The disk drive suspension according to claim 16, in which said spring portion has a center section proximate of and contiguous with said distal section, the longitudinal extent of said distal section being such that the heat of welding said spring portion distal edge margin to said rigid portion proximate edge margin does not substantially reduce the temper hardness of said center section.

18. The disk drive suspension according to claim 17, in which laterally opposed pairs of said left and right rail extents are substantially parallel.

19. The disk drive suspension according to claim 17, in which said base portion and said spring portion are separately formed and joined together solely by welding, said spring portion edge rails having distal and proximate extents on opposite sides of said locus of interruption, said distal and proximate extents being distal of said welding.

20. The disk drive suspension according to claim 19, in which said base portion has a distal edge margin, and said spring portion has a proximate edge margin, said distal and proximate edge margins being joined solely by welding.

21. The disk drive suspension according to claim 20, in which said edge rail extents include a pair of left and right hand proximate edge rail extents and a pair of left and right hand distal edge rail extents, said pairs being laterally opposed, the distal and proximate edge rail extents being longitudinally spaced across said locus of interruption.

22. The disk drive suspension according to claim 21, in which said spring portion has a proximate section adjacent said proximate edge margin that is free of welding, said proximate edge rail extents extending vertically from said proximate section in proximate section stiffening relation.

23. The disk drive suspension according to claim 22, in which said spring portion has a center section distal of and contiguous with said proximate section, the longitudinal extent of said proximate section being such that the heat of welding said spring portion proximate edge margin to said base portion distal edge margin does not substantially reduce the temper hardness of said center section.

24. A disk drive suspension having along a longitudinal axis a base portion, a rigid portion and a bendable spring portion, said spring portion having locally stiffened left and right edges extending from said base portion to said rigid portion but interrupted at a locus intermediate said base portion and said rigid portion, whereby bending of said spring portion is limited to said locus.

25. A disk drive suspension comprising a load beam having a base portion, a spring portion and a beam portion, said spring portion being normally bendable over a given axial extent between proximate and distal edge margins, said spring portion being locally stiffened by stiffening structure extending from said proximate and distal edge margins and having an interruption between said proximate and distal edge margins, whereby said spring portion is bendable only at said interruption.

26. The disk drive suspension according to claim 25, in which said stiffening structure interruption is intermediate the spring portion distal and proximate edge margins.

27. The disk drive suspension according to claim 26, in which said spring portion stiffening structure comprises interrupted right and left hand rails providing said local stiffening.

28. A disk drive suspension comprising a base portion, a beam portion and a spring portion therebetween, said spring portion having a proximate edge margin welded to said base portion, and a distal edge margin welded to said beam portion, and a center region between said proximate and distal edge margins, said center region having a proximate section contiguous with said proximate edge margin and subject to loss of temper hardness during welding of said proximate edge margin to said base portion, a distal section contiguous with said distal edge margin and subject to loss of temper hardness during welding of said distal edge margin to said rigid portion, and a center section between said proximate and distal sections that is sufficiently distant from said proximate and distal edge margins to not be subject to loss of temper hardness from welding at said edge margins, said spring portion normally being bendable throughout its said center region, said spring portion center region being locally stiffened in its proximate and distal sections to limit spring portion bending to said center section, whereby said spring portion bending is localized in said center section and unaffected by edge margin welding.

29. A method of limiting the bendable region of a disk drive suspension spring portion, including supporting said spring portion between a suspension base portion and a suspension rigid portion, stiffening said spring portion locally to limit the bendable region of said spring portion to the part of the spring portion free of local stiffening with a stiffening structure extending from said suspension base portion to said suspension rigid portion, and interrupting said stiffening structure to define said spring portion part free of local stiffening.

* * * * *